US012719836B2

(12) United States Patent
Albero et al.

(10) Patent No.: US 12,719,836 B2
(45) Date of Patent: Aug. 25, 2026

(54) DYNAMIC EVENT AND USER VALIDATION USING REFLECTANCE TRANSFORMATION IMAGING

(71) Applicant: Bank of America Corporation, Charlotte, NC (US)

(72) Inventors: George Albero, Charlotte, NC (US); Kathryn Mintz, Charlotte, NC (US); Maharaj Mukherjee, Poughkeepsie, NY (US); Naga Vamsi Krishna Akkapeddi, Charlotte, NC (US); Sanjay Lohar, Charlotte, NC (US); James Siekman, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 161 days.

(21) Appl. No.: 18/735,760

(22) Filed: Jun. 6, 2024

(65) Prior Publication Data

US 2025/0379850 A1 Dec. 11, 2025

(51) Int. Cl.
*H04L 9/40* (2022.01)
*G06V 10/40* (2022.01)
(Continued)

(52) U.S. Cl.
CPC ............ *H04L 63/029* (2013.01); *G06V 10/40* (2022.01); *G06V 40/00* (2022.01); *G06V 40/12* (2022.01);
(Continued)

(58) Field of Classification Search
CPC ......... H04L 9/40; H04L 63/029; G06V 10/40; G06V 40/00; G06V 40/12; G06V 40/1347; G06V 40/1365
See application file for complete search history.

(56) References Cited

U.S. PATENT DOCUMENTS 6,234,231 B1 5/2001 Boss et al.
9,341,625 B2 5/2016 Carson et al.
(Continued)

FOREIGN PATENT DOCUMENTS

WO WO-2023154393 A1 * 8/2023 ............ G06Q 50/12

OTHER PUBLICATIONS

"Reflectance Transformation Imaging"—Smithsonian Museum Conservation Institute, Apr. 23, 2020 https://mci.si.edu/reflectance-transformation-imaging (Year: 2020).*
(Continued)

*Primary Examiner* — Randy A Scott
(74) *Attorney, Agent, or Firm* — Banner & Witcoff, Ltd.

(57) ABSTRACT

A computing platform may receive, from an initiating user device, an event processing request. The computing platform may generate, using RTI, a first 3D representation of the event processing request. The computing platform may send, to a recipient user device, RTI transformation information indicating transformation actions to be performed, using RTI, to produce a second 3D representation of the event processing request. The computing platform may generate, using the first 3D representation and the second 3D representation, a complete 3D representation. The computing platform identify whether the complete 3D representation is validated. Based on identifying that the complete 3D representation is validated, process the event processing request.

20 Claims, 8 Drawing Sheets

(51) Int. Cl.
*G06V 40/00* (2022.01)
*G06V 40/12* (2022.01)

(52) U.S. Cl.
CPC ...... *G06V 40/1347* (2022.01); *G06V 40/1365* (2022.01); *H04L 9/40* (2022.05)

(56) References Cited

U.S. PATENT DOCUMENTS 9,575,393 B2 2/2017 Altshuler
9,678,322 B2 6/2017 Messier et al.
10,144,916 B2 12/2018 Martin et al.
10,148,051 B2 12/2018 Wilcock et al.
11,151,374 B2 10/2021 Cugnet et al.
11,341,459 B2 * 5/2022 Geldenhuys ....... G06V 40/1347
2015/0050667 A1 2/2015 Carson et al.
2015/0077536 A1 3/2015 Messier et al.
2016/0116825 A1 4/2016 Altshuler
2017/0153236 A1 6/2017 Martin et al.
2017/0187156 A1 6/2017 Wilcock et al.
2019/0205642 A1 7/2019 Cugnet et al.
2021/0042703 A1 * 2/2021 Geldenhuys ........... G06Q 10/06
2022/0070236 A1 * 3/2022 Yerli ...................... G06V 20/20
2022/0183616 A1 * 6/2022 Riley ..................... G16H 50/20

OTHER PUBLICATIONS

"Single-Frequency Imagin and Material Characterization Using Reconfigurable Reflectrays"—Zhang et al, IEEE Transactions on Microwave Theory and Techniques, vol. 69, No. 7, Jul. 2021 https://par.nsf.gov/servlets/purl/10349566 (Year: 2021).*
"Reflectance Transformation Imaging" Smithsonian Museum Conservation Institute, https://mci.si.edu/reflectance-transformation-imaging, 15 pages, website visited Jun. 6, 2024.

* cited by examiner

100

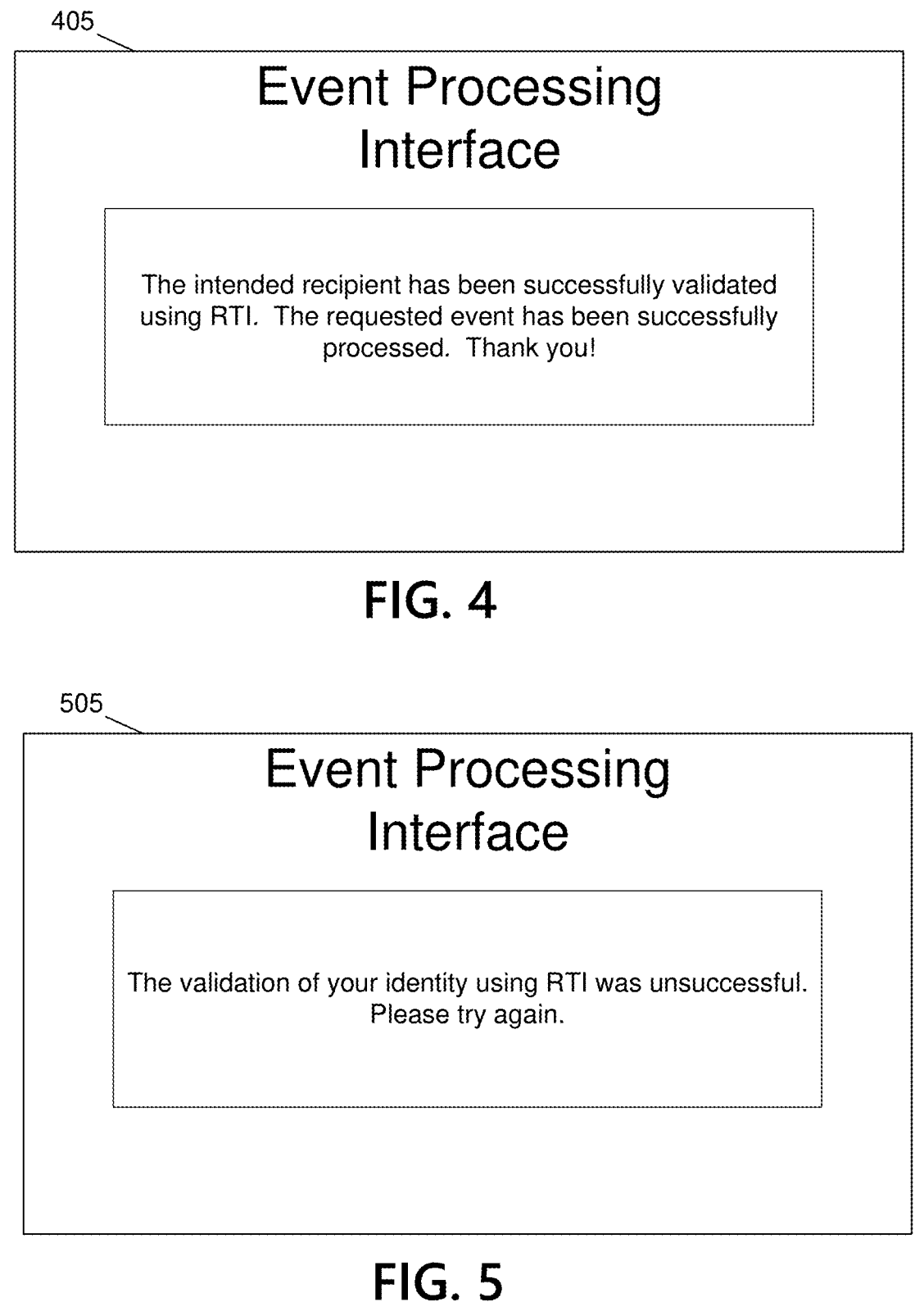

405

Event Processing Interface

The intended recipient has been successfully validated using RTI. The requested event has been successfully processed. Thank you!

Event Processing Interface

The validation of your identity using RTI was unsuccessful. Please try again.

FIG. 5

DYNAMIC EVENT AND USER VALIDATION USING REFLECTANCE TRANSFORMATION IMAGING

BACKGROUND

In some instances, the processing of events may occur between parties located on different sides of a firewall. For example, such parties may include customers, vendors, employees, or the like. Where such processing involves the transmission of supporting documentation across the firewall, it may be susceptible to interception by malicious actors and/or other unintended recipients. Accordingly, it may be important to offer an improved security mechanism to protect against such security threats in the processing of these cross-firewall events.

SUMMARY

Aspects of the disclosure provide effective, efficient, scalable, and convenient technical solutions that address and overcome the technical problems associated with security in the processing of requested events. In accordance with one or more embodiments of the disclosure, a computing platform comprising at least one processor, a communication interface, and memory storing computer-readable instructions may receive, from an initiating user device, an event processing request. The computing platform may generate, using reflectance transformation imaging (RTI), a first three dimensional representation of the event processing request. The computing platform may send, to a recipient user device, RTI transformation information indicating transformation actions to be performed, using RTI, to produce a second three dimensional representation of the event processing request, where a combination of the first three dimensional representation and the second three dimensional representation may produce a complete three dimensional representation of the event processing request, and where the second three dimensional representation may be produced via communication between the recipient user device and the computing platform without transmitting any three dimensional representation to the recipient user device. The computing platform may generate, using the first three dimensional representation and the second three dimensional representation, the complete three dimensional representation. The computing platform may identify whether the complete three dimensional representation is validated. Based on identifying that the complete three dimensional representation is validated, the computing platform may process the event processing request.

In one or more instances, the event processing request may be a request to process a transaction. In one or more instances, generating the first three dimensional representation may include: 1) generating an initial three dimensional representation of the event processing request, and 2) modifying, using RTI, the initial three dimensional representation to include one or more unique surface phenomena signatures.

In one or more examples, a number of the one or more unique surface phenomena signatures may be selected based on a value associated with the event processing request. In one or more examples, the one or more unique surface phenomena signatures may include adjustments of shading in the initial three dimensional representation.

In one or more instances, the computing platform may generate, after generating the first three dimensional representation, a unique surface template designed to fit into the first three dimensional representation to generate the complete three dimensional representation, where the RTI transformation information may be defined by the unique surface template. In one or more instances, based on identifying that the three dimensional representation is validated, the computing platform may enable viewing, by the recipient user device, of details corresponding to the event processing request.

In one or more examples, based on identifying that the three dimensional representation is not validated, the computing platform may: 1) increment a failure count corresponding to the event processing request, 2) compare the failure count to a predefined failure threshold, 3) based on identifying that the failure count meets or exceeds the predefined failure threshold, deny fulfillment of the event processing request on behalf of the recipient user device, and 4) based on identifying that the failure count does not meet or exceed the predefined failure threshold, prompt the recipient user device to produce an updated three dimensional representation.

In one or more instances, producing the second three dimensional representation via communication between the recipient user device and the computing platform without transmitting any three dimensional representation to the recipient user device may include: 1) granting the recipient user device access to view an obscured representation of the event processing request, 2) receiving RTI instructions from the recipient user device based on the RTI transformation information, and 3) producing the second three dimensional representation based on the RTI instructions. In one or more instances, the recipient user device may be located outside a protected network associated with the computing platform.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4-5 depict illustrative user interfaces for performing dynamic event and user validation using RTI in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to performing dynamic event and user validation using RTI. For example, in some instances, transactions may be susceptible to bad actors during transit, particularly those that include supporting documents and/or are submitted by customers across a firewall. For example, a customer may submit an image corresponding to a payment for a vendor, other customer, and/or other transaction type.

Accordingly, described herein is an RTI networked 3D rendition of transactions that enables parties to generate and authenticate using unique surface phenomena signatures. A partner's system may be able to view the transaction, which may include a matching surface template that may fit like a 3D Completely Automated Public Turing Test to Tell Computers and Humans Apart ("CAPTCHA"). In some instances, the unique surface phenomena signatures may be lased.

To do so, the following steps may be performed. 1) Generate a transaction with limited details; 2) Create a 3D rendition of the transaction using RTI; 3) Lase the 3D transaction using unique surface phenomena signatures; 4) Notify the partner system of the transaction (e.g., without either party knowing a pattern of the transaction); 5) Notify the partner system which 3D CAPTCHA to use; 6) After authenticating the partner's 3D CAPTCHA, grant them full view of the requested transaction; 7) Otherwise, if authentication fails, deny the partner from viewing the complete view of the transaction.

These and other features are described in further detail below.

Figure 1A:
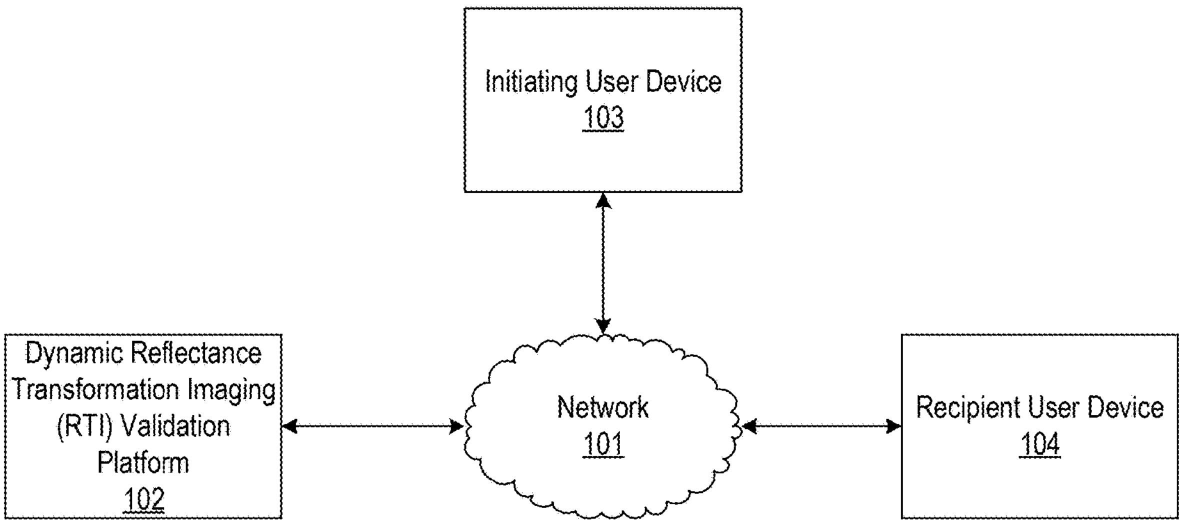
FIGS. 1A-1B depict an illustrative computing environment configured to perform dynamic event and user validation using RTI in accordance with one or more example embodiments.
Figure 1B:
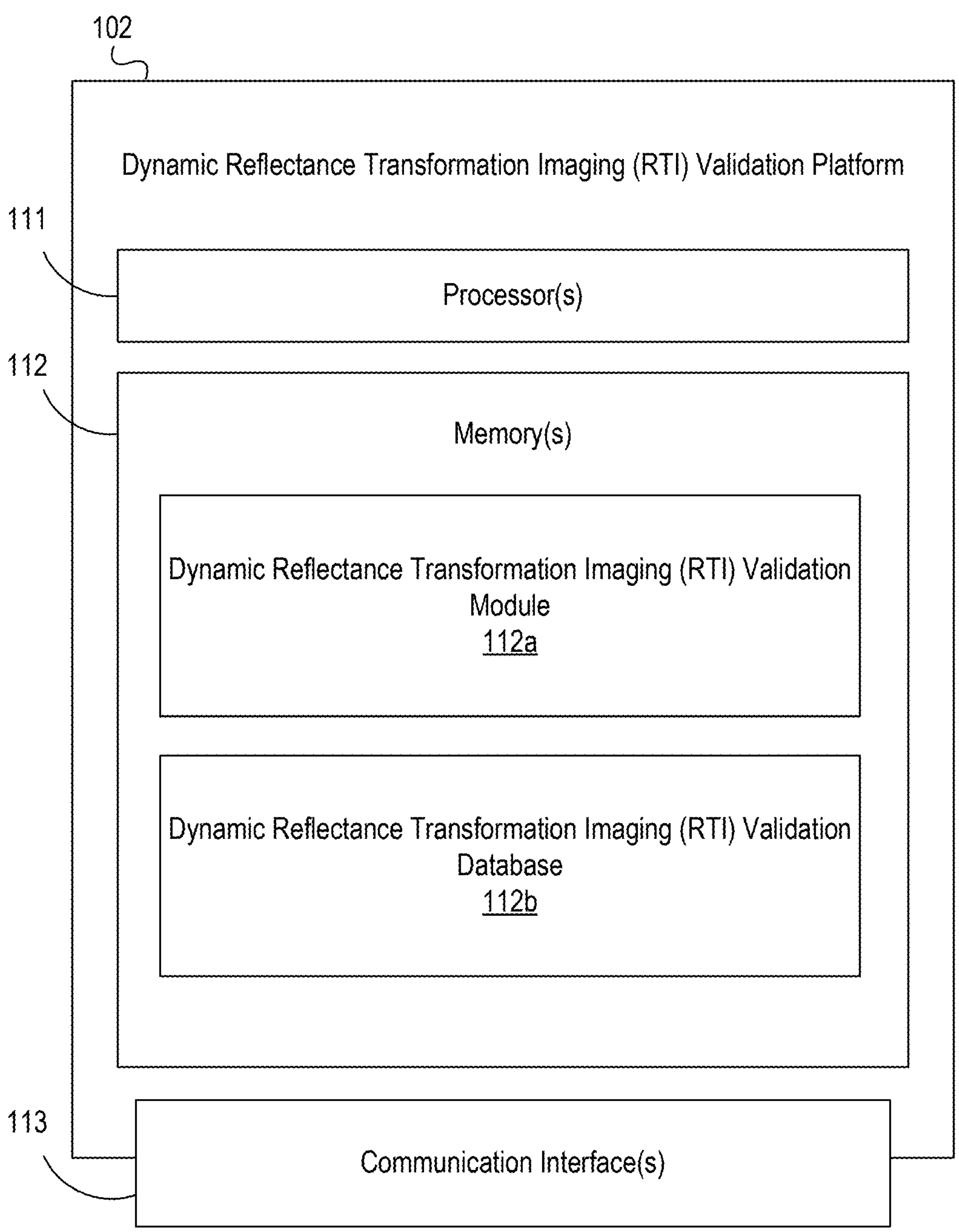

FIGS. 1A-1B depict an illustrative computing environment for performing dynamic event and user validation using RTI in accordance with one or more example embodiments. Referring to FIG. 1A, computing environment 100 may include one or more computer systems. For example, computing environment 100 may include dynamic reflectance transformation imaging (RTI) validation platform 102, initiating user device 103, and recipient user device 104.

Dynamic RTI validation platform 102 may be a computer system that includes one or more computing devices (e.g., servers, server blades, or the like) and/or other computer components (e.g., processors, memories, communication interfaces) that may be used to generate three dimensional representations of requested events (e.g., requested transactions), perform RTI transformations to the representations (on behalf of both an initiator and recipient of the request), and to validate the recipient using the RTI transformations. In some instances, the dynamic RTI validation platform 102 may be configured to process one or more requested events (e.g., cause a transfer of funds from an account of an initiator of the request and to a recipient of the request, or the like), and/or the dynamic RTI validation platform 102 may communicate with one or more other computing systems to process the request.

Initiating user device 103 may be and/or otherwise include one or more devices such as a laptop computer, desktop computer, mobile device, tablet, smartphone, and/or other device that may be used by an individual to submit requests to process events. In some instances, the initiating user device 104 may be configured to display one or more graphical user interfaces (e.g., event processing interfaces, or the like). In some instances, the initiating user device 103 may be connected to a first network, protected by a firewall.

Recipient user device 104 may be and/or otherwise include one or more devices such as a laptop computer, desktop computer, mobile device, tablet, smartphone, and/or other device that may be used by an individual to access and/or otherwise confirm processing of a requested event. In these instances, the recipient user device 104 may be used to validate an identity of the recipient user prior to processing of the requested event. In some instances, the recipient user device 104 may be configured to display one or more graphical user interfaces (e.g., event processing interfaces, or the like). In some instances, the recipient user device 104 may be connected to a second network, which may, e.g., be on a different side of the firewall than the first network.

Although a single initiating user device 103 and recipient user device 104 are shown, any number of such devices may be used to implement the methods described herein without departing from the scope of the disclosure.

Computing environment 100 also may include one or more networks, which may interconnect dynamic RTI validation platform 102, initiating user device 103, and recipient user device 104. For example, computing environment 100 may include a network 101 (which may interconnect, e.g., dynamic RTI validation platform 102, initiating user device 103, and recipient user device 104).

In one or more arrangements, dynamic RTI validation platform 102, initiating user device 103, and recipient user device 104 may be any type of computing device capable of sending and/or receiving requests and processing the requests accordingly. For example, dynamic RTI validation platform 102, initiating user device 103, recipient user device 104, and/or the other systems included in computing environment 100 may, in some instances, be and/or include server computers, desktop computers, laptop computers, tablet computers, smart phones, and/or other devices that may include one or more processors, memories, communication interfaces, storage devices, and/or other components. As noted above, and as illustrated in greater detail below, any and/or all of dynamic RTI validation platform 102, initiating user device 103, and/or recipient user device 104 may, in some instances, be special-purpose computing devices configured to perform specific functions.

Referring to FIG. 1B, dynamic RTI validation platform 102 may include one or more processors 111, memory 112, and communication interface 113. A data bus may interconnect processor 111, memory 112, and communication interface 113. Communication interface 113 may be a network interface configured to support communication between dynamic RTI validation platform 102 and one or more networks (e.g., network 101, or the like). Memory 112 may include one or more program modules having instructions that when executed by processor 111 cause dynamic RTI validation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of dynamic RTI validation platform 102 and/or by different computing devices that may form and/or otherwise make up dynamic RTI validation platform 102. For example, memory 112 may have, host, store, and/or include dynamic RTI validation module **112*a* and dynamic RTI validation database 112*b***.

Dynamic RTI validation module **112*a* may store and/or otherwise execute one or more instructions that may cause the dynamic RTI validation platform 102 to execute advanced techniques to provide enhanced security in event processing, as is described further herein. Dynamic RTI validation database 112***b* may store instructions that, when executed by the dynamic RTI validation module 112*a* and/or dynamic RTI validation platform 102 provide enhanced security in event processing, as is described further herein.

Figure 2A:
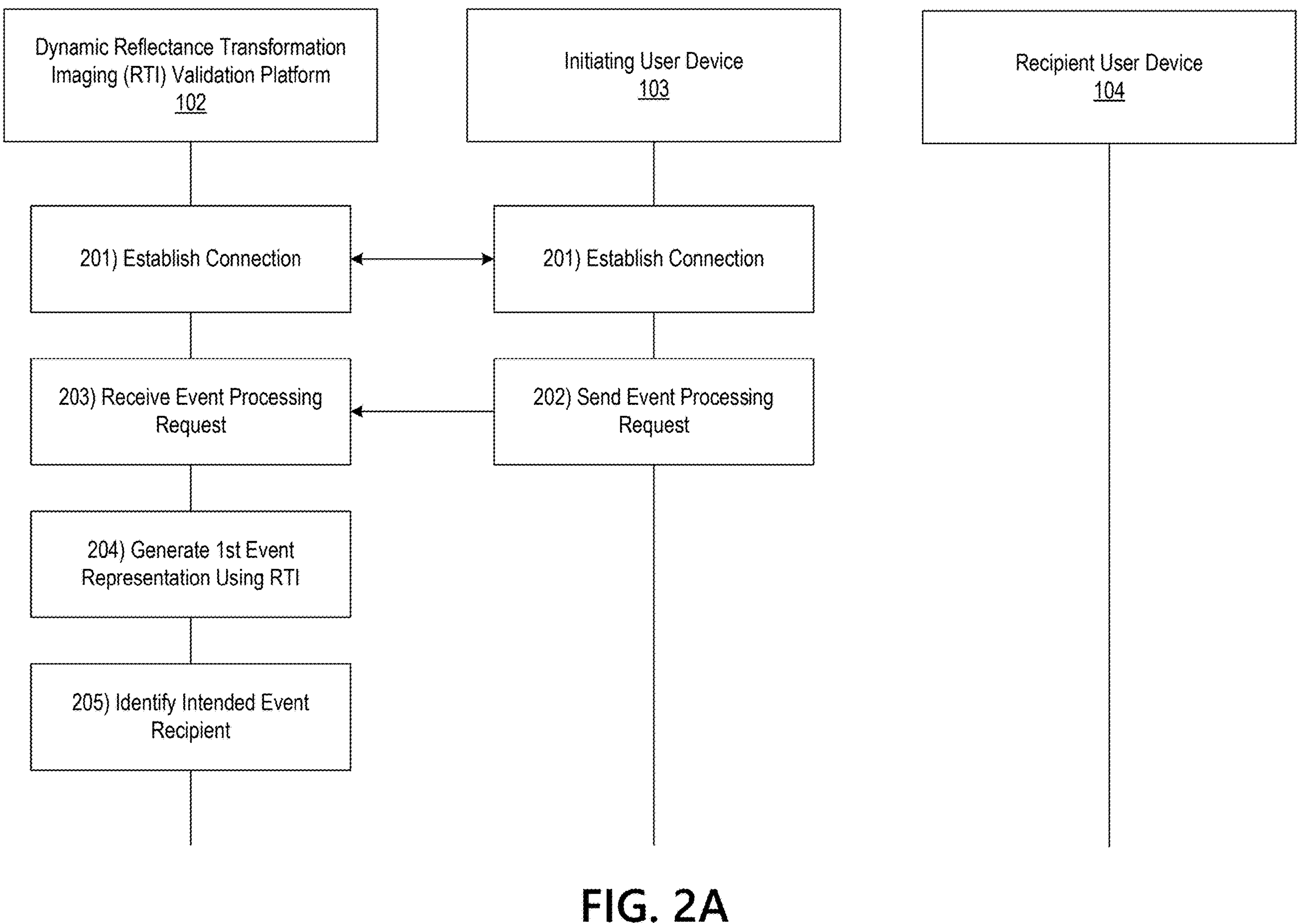
FIGS. 2A-2D depict an illustrative event sequence for performing dynamic event and user validation using RTI in accordance with one or more example embodiments.

FIGS. 2A-2D depict an illustrative event sequence for performing dynamic event and user validation using RTI accordance with one or more example embodiments. Referring to FIG. 2A, at step 201, the initiating user device 103 may establish a connection with the dynamic RTI validation platform 102. For example, the initiating user device 103 may establish a first wireless data connection with the dynamic RTI validation platform 102 (e.g., in preparation for sending event processing requests). In some instances, the initiating user device 103 may identify whether a connection is already established with the dynamic RTI validation platform 102. If a connection is not yet established with the dynamic RTI validation platform 102, the initiating user device 103 may establish the first wireless data connection as described herein. Otherwise, if a connection is already established with the dynamic RTI validation platform 102, the initiating user device 103 might not re-establish the connection.

At step 202, the initiating user device 103 may send an event processing request to the dynamic RTI validation platform 102. For example, the initiating user device 103 may send a request to process a transaction and/or other event. In some instances, the initiating user device 103 may send the event processing request to the dynamic RTI validation platform 102 while the first wireless data connection is established.

At step 203, the dynamic RTI validation platform 102 may receive the event processing request sent at step 202. For example, the dynamic RTI validation platform 102 may receive the event processing request via the communication interface 113 and while the first wireless data connection is established.

At step 204, the dynamic RTI validation platform 102 may generate a first event representation using RTI. For example, the dynamic RTI validation platform 102 may generate a complete three dimensional representation of the requested event. Once the three dimensional representation is generated, the dynamic RTI validation platform 102 may use RTI to embed one or more unique surface phenomena signatures into the complete three dimensional representation. For example, the dynamic RTI validation platform 102 may modify shading, lighting, and/or colors of various portions of the representation, include markings, create undulation, and/or otherwise modify the complete three dimensional representation. In some instances, the dynamic RTI validation platform 102 may lase these modifications into the complete three dimensional representation.

In some instances, once this complete three dimensional representation of the requested event is generated, the dynamic RTI validation platform 102 may generate a first unique surface phenomena template, which may include a first portion of the RTI modifications made to the complete three dimensional representation. Using this first unique surface phenomena template, the dynamic RTI validation platform 102 may generate a first three dimensional representation, which may, e.g., be similar to the complete three dimensional representation, but might not include all of the corresponding unique surface phenomena signatures. For example, any remaining unique surface phenomena signatures, not included in the first three dimensional representation, may be similar to a puzzle piece or CAPTCHA that is missing from the first three dimensional representation. In some instances, a number of unique surface phenomena applied may be based on a value associated with the event processing request. Additionally or alternatively, the number of unique surface phenomena or the phenomena themselves may depend on a particular time at which the event processing request is sent.

At step 205, the dynamic RTI validation platform 102 may identify an intended recipient for the event processing request. In some instances, this recipient may have been specified in the event processing request. The dynamic RTI validation platform 102 may identify a device and/or other account associated with the recipient user (e.g., recipient user device 104).

Figure 2B:
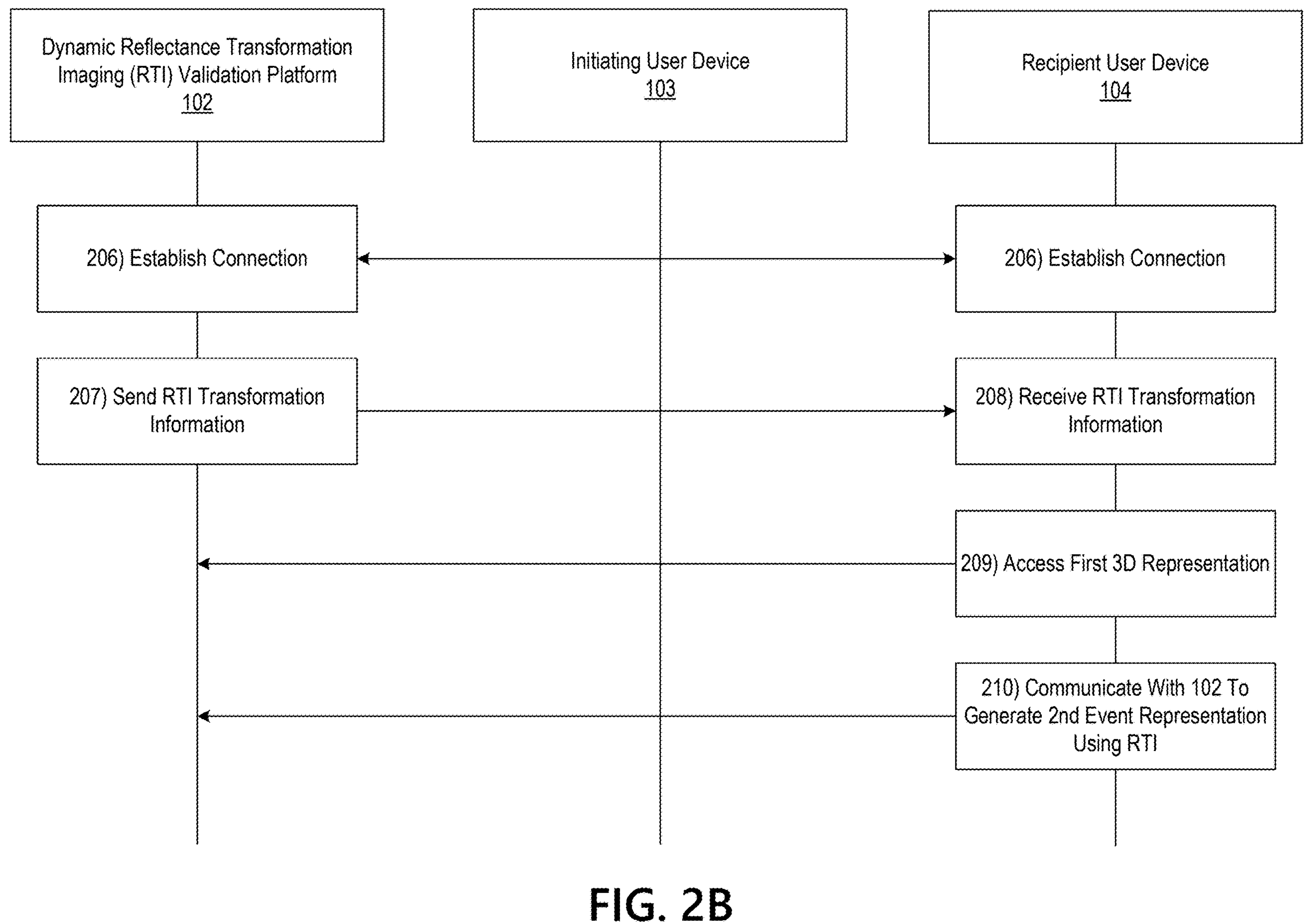

Referring to FIG. 2B., at step 206, the dynamic RTI validation platform 102 may establish a connection with the recipient user device 104. For example, the dynamic RTI validation platform 102 may establish a second wireless data connection with the recipient user device 104 to link the dynamic RTI validation platform 102 with the recipient user device 104 (e.g., in preparation for sending RTI transformation information). In some instances, the dynamic RTI validation platform 102 may identify whether or not a connection is already established with the recipient user device 104. If a connection is already established with the recipient user device 104, the dynamic RTI validation platform 102 might not re-establish the connection. Otherwise, if a connection is not yet established with the recipient user device 104, the dynamic RTI validation platform 102 may establish the second wireless data connection as described herein.

At step 207, the dynamic RTI validation platform 102 may send RTI transformation information to the recipient user device 104. For example, the dynamic RTI validation platform 102 may send unique surface phenomena template information, which may correspond to the unique surface phenomena included in the complete three dimensional representation but not in the first three dimensional representation. For example, this unique surface phenomena template information may be used to modify the first three dimensional representation to include these missing pieces of the unique surface phenomena, and thus may effectively act as the missing puzzle piece, CAPTCHA, or the like that may complete the first three dimensional representation. In some instances, the dynamic RTI validation platform 102 may send the RTI transformation information via the communication interface 113 and while the second wireless data connection is established.

At step 208, the recipient user device 104 may receive the RTI transformation information sent at step 207. For example, the recipient user device 104 may receive the RTI transformation information while the second wireless data connection is established.

At step 209, the recipient user device 104 may access the first three dimensional representation by communicating with the dynamic RTI validation platform 102 (e.g., via the second wireless data connection). For example, although the RTI transformation information may have been shared with the recipient user device 104, none of the three dimensional representations may actually be sent to the recipient user device 104 (which may, e.g., enhance security of the event processing request by avoiding the transmission of any information and/or documentation corresponding to the event processing request to the recipient user device 104, which may, e.g., be operating on another side of a firewall than the dynamic RTI validation platform 102). Rather, the dynamic RTI validation platform 102 may access a version of the first three dimensional representation (which may, e.g., have one or more values and/or pieces of information corresponding to the event processing request obscured), and may enable the recipient user device 104 to view this version. In some instances, rather than causing the recipient user device 104 to view the version of the first three dimensional representation, the dynamic RTI validation platform 102 may cause the recipient user device 104 to view a version of the initial three dimensional representation generated at step 204 (e.g., prior to application of the unique surface phenomena used to generate the first three dimensional representation), without actually transmitting any three dimensional representation to the recipient user device 104.

At step 210, the recipient user device 104 may communicate with the dynamic RTI validation platform 102 (e.g., while viewing the version of the initial or first three dimensional representation) to apply the unique surface phenomena, indicated in the RTI transformation information, to this version. In doing so, the recipient user device 104 may cause the dynamic RTI validation platform 102 to modify the version of the three dimensional representation, using RTI, to produce a second three dimensional representation, which may, e.g., include these applied unique surface phenomena, and may effectively act as the missing puzzle piece, CAPTCHA, or the like that may complete the first three dimensional representation. In some instances, a number of unique surface phenomena applied may be based on a value associated with the event processing request. Additionally or alternatively, the number of unique surface phenomena or the phenomena themselves may depend on a particular time at which the event processing request is sent. For example, a combination of the first three dimensional representation and the second three dimensional representation may match the complete three dimensional representation.

Figure 2C:
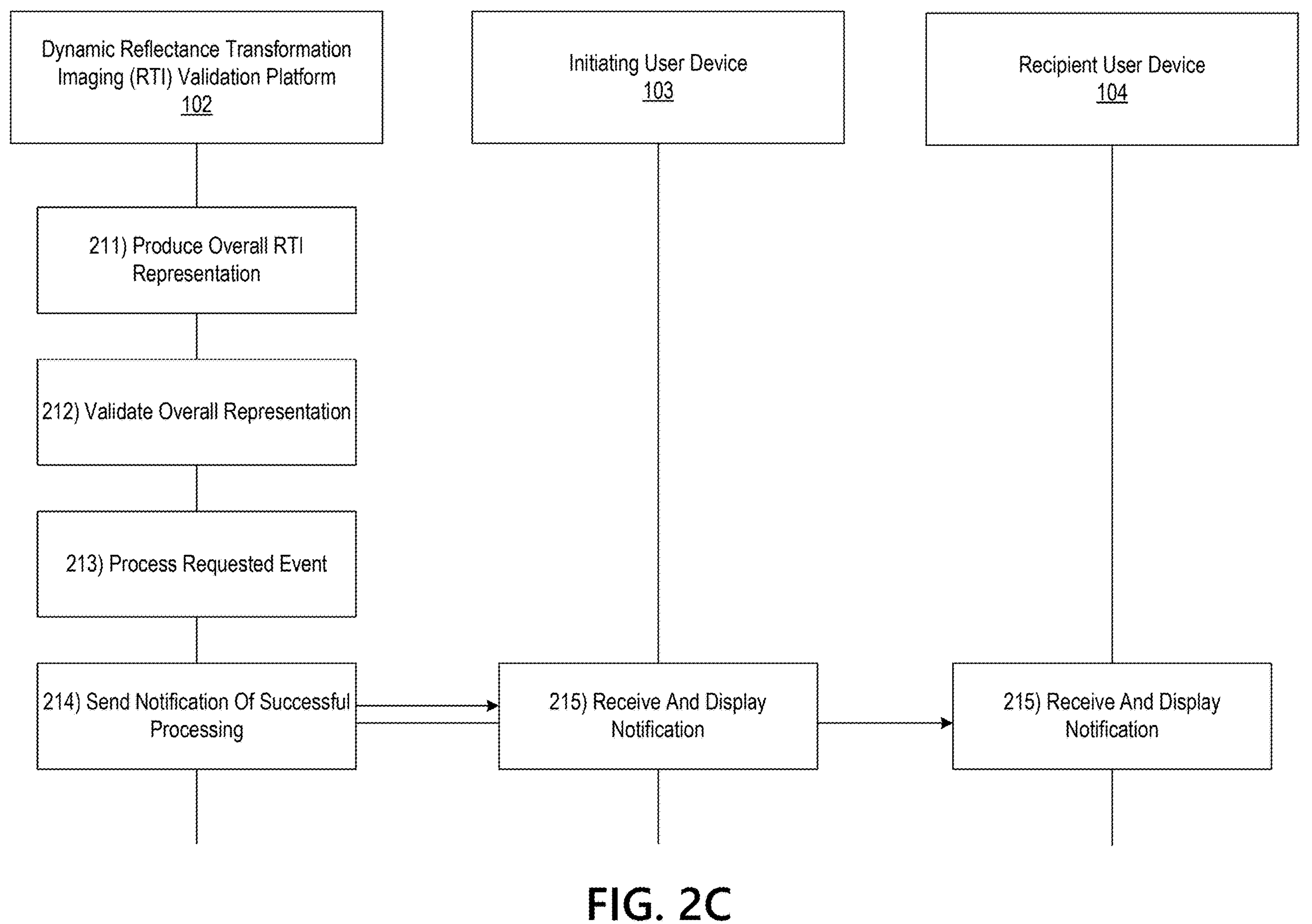

Referring to FIG. 2C, at step 211, the dynamic RTI validation platform 102 may produce an overall RTI representation by combining the first and second three dimensional representations. At step 212, the dynamic RTI validation platform 102 may validate the overall RTI representation by comparing it to the complete three dimensional representation. If the dynamic RTI validation platform 102 identifies that the overall representation matches the complete three dimensional representation, the dynamic RTI validation platform 102 may proceed to step 213. Otherwise, if the dynamic RTI validation platform 102 identifies that the overall representation does not match the complete three dimensional representation, the dynamic RTI validation platform 102 may proceed to step 216.

At step 213, the dynamic RTI validation platform 102 may process the requested event. For example, the dynamic RTI validation platform 102 may cause funds, corresponding to the requested event, to be transferred from an account of the initiating user device 103 to an account of the recipient user device 104. Alternatively, the dynamic RTI validation platform 102 may instruct another system to process the requested event.

At step 214, the dynamic RTI validation platform 102 may send a notification of the successfully processed event to the initiating user device 103 and/or recipient user device 104. For example, the dynamic RTI validation platform 102 may send the notification of the successfully processed event to the initiating user device 103 and/or recipient user device 104 via the communication interface 113 and while the first and/or second wireless data connections are established. In some instances, the dynamic RTI validation platform 102 may send one or more commands directing the initiating user device 103 and/or recipient user device 104 to display the notification of the successfully processed event.

At step 215, the initiating user device 103 and/or recipient user device 104 may receive the notification of the successfully processed event, sent at step 214. For example, the initiating user device 103 and/or recipient user device 104 may receive the notification of the successfully processed event while the first and/or second wireless data connections are established. In some instances, the initiating user device 103 and/or recipient user device 104 may receive the one or more commands directing the initiating user device 103 and/or recipient user device 104 to display the notification of the successfully processed event. Based on or in response to these commands, the initiating user device 103 and/or recipient user device 104 may display a graphical user interface. For example, the initiating user device 103 and/or recipient user device 104 may display a graphical user interface similar to graphical user interface 405, which is illustrated in FIG. 4. Subsequently, the event sequence may end.

Figure 2D:
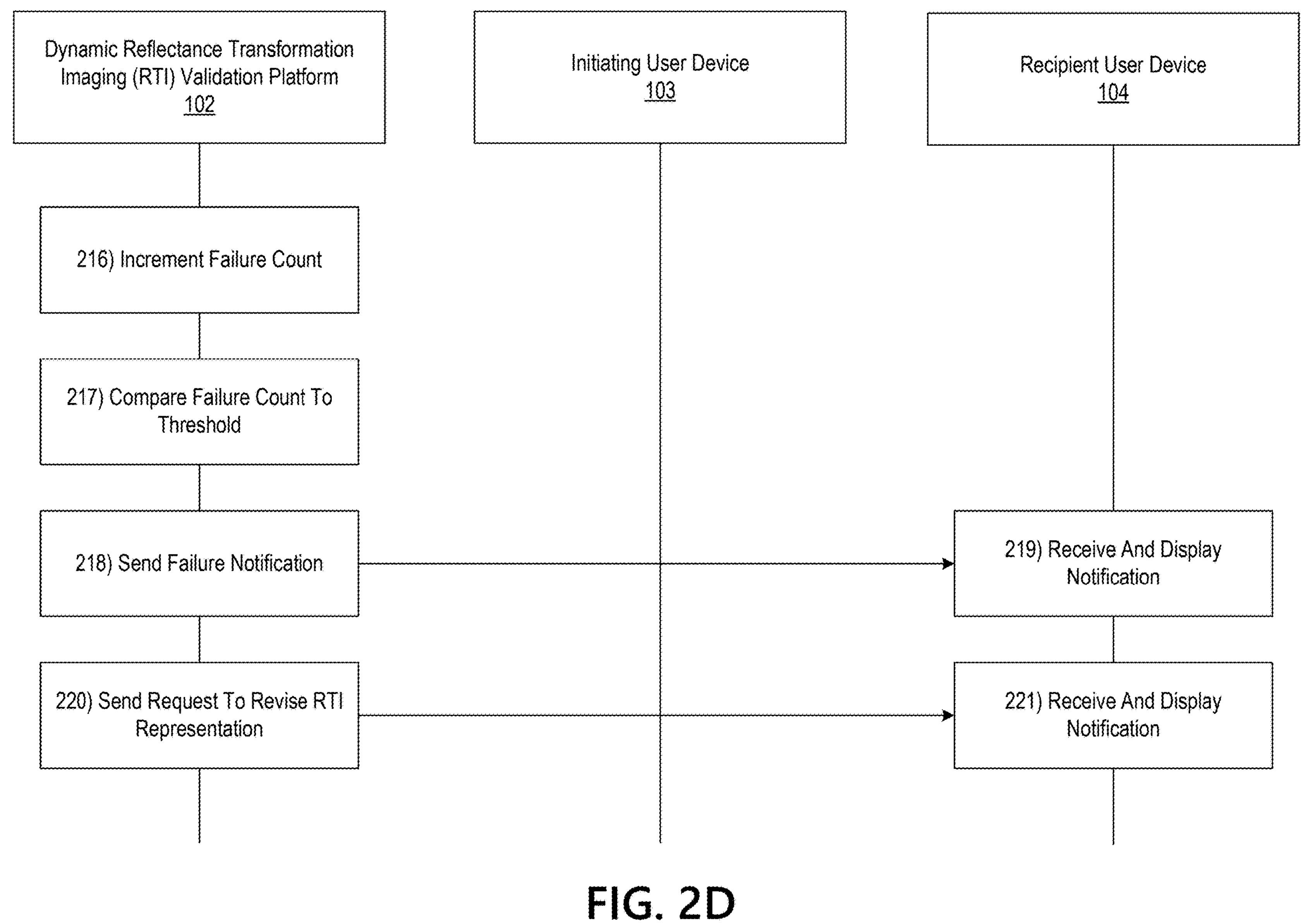

Returning to step 212, if the dynamic RTI validation platform 102 identified that the overall RTI representation generated at step 211 is not validated, it may proceed to step 216. Referring to FIG. 2D, at step 216, the dynamic RTI validation platform 102 may increment a failure counter. For example, the dynamic RTI validation platform 102 may increment a failure counter for the event processing request to indicate a current number of unsuccessful attempts to complete the request.

At step 217, the dynamic RTI validation platform 102 may compare the current failure count to a failure threshold. Based on identifying that the failure count meets or exceeds the failure threshold, the dynamic RTI validation platform 102 may proceed to step 218. Otherwise, if the failure count is less than the failure threshold, the dynamic RTI validation platform 102 may proceed to step 219. By operating in this way, the dynamic RTI validation platform 102 may prevent mass and/or otherwise repeated attempts to maliciously intercept information of the event processing request, while balancing the interests of a genuine recipient of the event processing request, who may, e.g., have incurred an unintentional error in producing the second three dimensional representation.

At step 218, the dynamic RTI validation platform 102 may send a failure notification to the recipient user device 104. For example, the dynamic RTI validation platform 102 may send the failure notification to the recipient user device 104 via the communication interface 113 and while the second wireless data connection is established. In some instances, the dynamic RTI validation platform 102 may also send one or more commands directing the recipient user device 104 to display the failure notification.

At step 219, the recipient user device 104 may receive the failure notification. For example, the recipient user device 104 may receive the failure notification while the second wireless data connection is established. In some instances, the recipient user device 104 may also receive the one or more commands directing the recipient user device 104 to display the failure notification. Based on or in response to these commands, the recipient user device 104 may display the failure notification. For example, the recipient user device 104 may a graphical user interface indicating that the request was not successfully processed due to a failure in the RTI validation, and that due to a maximum number of processing attempts being exceeded, the request has been terminated. Subsequently, the event sequence may end.

Returning to step 217, if the dynamic RTI validation platform identified that the failure count did not meet or exceed the failure threshold, it may proceed to step 220. At step 220, the dynamic RTI validation platform 102 may send the recipient user device 104 a request to revise the RTI representation. In some instances, the dynamic RTI validation platform 102 may send the request via the communication interface 113 and while the second wireless data connection is established. In some instances, the dynamic RTI validation platform 102 may also send one or more commands directing the recipient user device 104 to display the request.

At step 221, the recipient user device 104 may receive the request sent at step 220. For example, the recipient user device 104 may receive the request while the second wireless data connection is established. In some instances, the recipient user device 104 may also receive the one or more commands directing the recipient user device 104 to display the request. Based on or in response to the one or more commands directing the recipient user device 104 to display the request, the recipient user device 104 may display the request. For example, the recipient user device 104 may display a graphical user interface similar to graphical user interface 505, which is illustrated in FIG. 5. The recipient user device 104 may then return to step 209, to allow the recipient user to update the second three dimensional representation according to the RTI transformation information.

Figure 3:
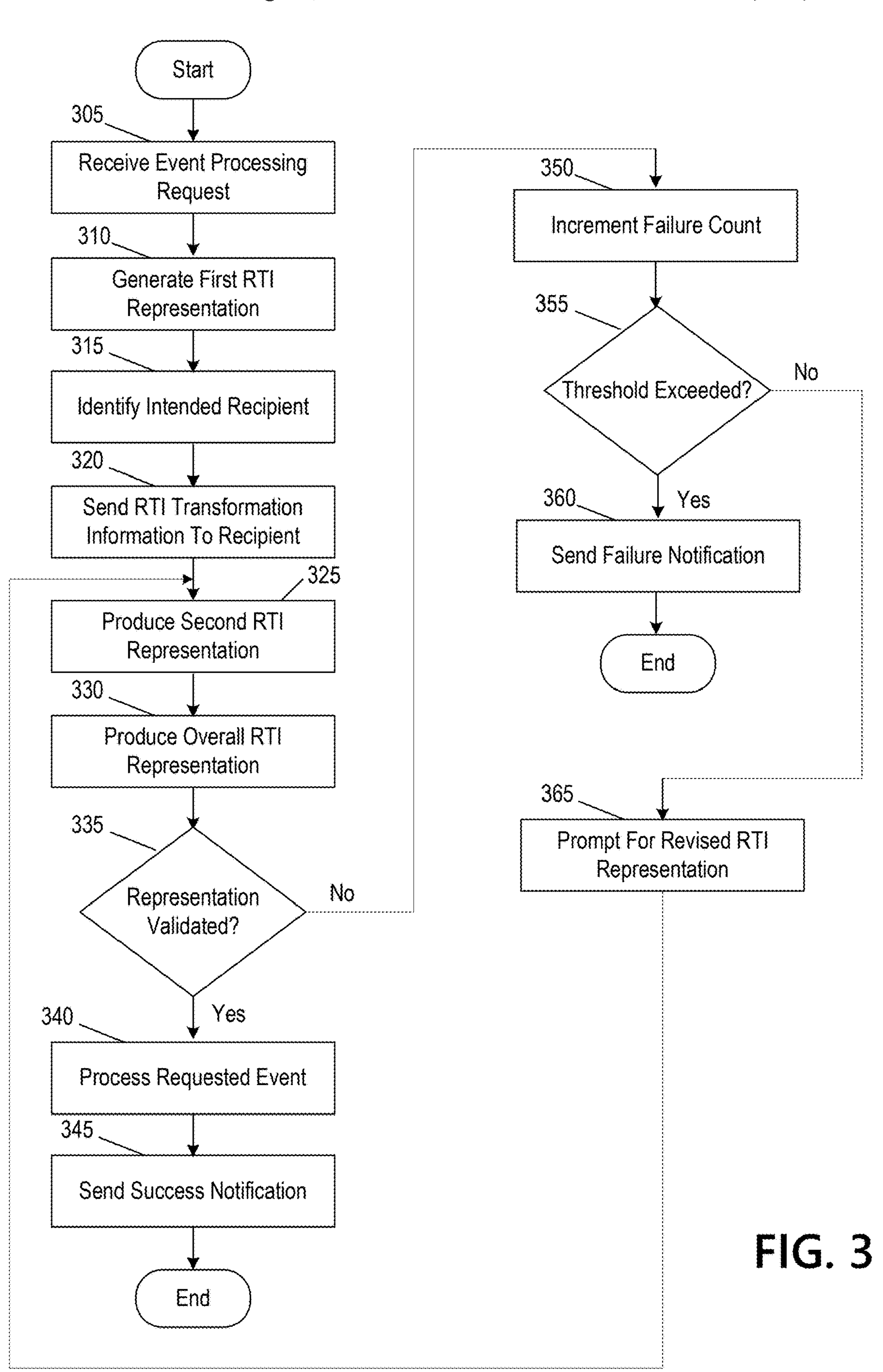
FIG. 3 depicts an illustrative method for performing dynamic event and user validation using RTI in accordance with one or more example embodiments.

FIG. 3 depicts an illustrative method for performing dynamic event and user validation using RTI in accordance with one or more example embodiments. Referring to FIG. 3, at step 305, a computing platform having at least one processor, a communication interface, and memory may receive an event processing request. At step 310, the computing platform may generate a first RTI representation of the event processing request. At step 315, the computing platform may identify an intended recipient of the event processing request. At step 320, the computing platform may send RTI transformation information to the recipient. At step 325, the computing platform may produce a second RTI representation on behalf of the recipient. At step 330, the computing platform may combine the first RTI representation and the second RTI representation to produce an overall RTI representation. At step 335, the computing platform may identify whether or not the overall RTI representation is validated. If the overall RTI representation is validated, the computing platform may proceed to step 340. Otherwise, the computing platform may proceed to step 350.

At step 340, the computing platform may process the requested event. At step 345, the computing platform may notify the parties to the event processing request of the successful processing. Subsequently, the method may end.

Returning to step 335, if the overall representation is not validated, the computing platform may proceed to step 350. At step 350, the computing platform may increment a failure count corresponding to the event processing request. At step 355, the computing platform may identify whether or not a failure threshold is met or exceeded by the failure count. If the failure threshold is met or exceeded, the computing platform may proceed to step 360. Otherwise, if the failure count does not meet the failure threshold, the computing platform may proceed to step 365. At step 360, the computing platform may send a failure notification to the parties to the event processing request. Subsequently the method may end.

Returning to step 355, if the failure threshold is met or exceeded, the computing platform may proceed to step 365. At step 365, the computing platform may prompt the recipient user device for a revised RTI representation. The computing platform may then return to step 325.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
- at least one processor;
- a communication interface communicatively coupled to the at least one processor; and
- memory storing computer-readable instructions that, when executed by the at least one processor, cause the computing platform to:
  - receive, from an initiating user device, an event processing request;
  - generate, using reflectance transformation imaging (RTI), a first three dimensional representation of the event processing request, wherein generating the first three dimensional representation comprises:
    - generating an initial three dimensional representation of the event processing request, and
    - modifying, using RTI, the initial three dimensional representation to include one or more unique surface phenomena signatures, wherein a number of the one or more unique surface phenomena signatures is selected based on a value associated with the event processing request and a particular time at which the event processing request is sent;
  - send, to a recipient user device, RTI transformation information indicating transformation actions to be performed, using RTI, to produce a second three dimensional representation of the event processing request, wherein a combination of the first three dimensional representation and the second three dimensional representation produces a complete three dimensional representation of the event processing request, and wherein the second three dimensional representation is produced via communication between the recipient user device and the computing platform without transmitting any three dimensional representation to the recipient user device;
  - generate, using the first three dimensional representation and the second three dimensional representation, the complete three dimensional representation;
  - identify whether the complete three dimensional representation is validated; and
  - based on identifying that the complete three dimensional representation is validated, process the event processing request.

2. The computing platform of claim 1, wherein the event processing request comprises a request to process a transaction.

3. The computing platform of claim 1, wherein the one or more unique surface phenomena signatures comprise adjustments of shading in the initial three dimensional representation.

4. The computing platform of claim 1, wherein the memory stores additional computer-readable instructions that, when executed by the at least one processor, cause the computing platform to:
- generate, after generating the first three dimensional representation, a unique surface template designed to fit into the first three dimensional representation to generate the complete three dimensional representation, wherein the RTI transformation information is defined by the unique surface template.

5. The computing platform of claim 1, wherein the memory stores additional computer-readable instructions that, when executed by the at least one processor, cause the computing platform to
- based on identifying that the three dimensional representation is validated, enable viewing, by the recipient user device, of details corresponding to the event processing request.

6. The computing platform of claim 1, wherein the memory stores additional computer-readable instructions that, when executed by the at least one processor, cause the computing platform to:
- based on identifying that the three dimensional representation is not validated:
  - increment a failure count corresponding to the event processing request;
  - compare the failure count to a predefined failure threshold;
  - based on identifying that the failure count meets or exceeds the predefined failure threshold, deny fulfillment of the event processing request on behalf of the recipient user device; and
  - based on identifying that the failure count does not meet or exceed the predefined failure threshold, prompt the recipient user device to produce an updated three dimensional representation.

7. The computing platform of claim 1, wherein producing the second three dimensional representation via communication between the recipient user device and the computing platform without transmitting any three dimensional representation to the recipient user device comprises:
- granting the recipient user device access to view an obscured representation of the event processing request;
- receiving RTI instructions from the recipient user device based on the RTI transformation information; and
- producing the second three dimensional representation based on the RTI instructions.

8. The computing platform of claim 1, wherein the recipient user device is located outside a protected network associated with the computing platform.

9. The computing platform of claim 1, wherein the memory stores additional computer-readable instructions that, when executed by the at least one processor, cause the computing platform to:
- lase the one or more unique surface phenomena signatures into the initial three dimensional representation of the event processing request.

10. The computing platform of claim 9, wherein lasing the one or more unique surface phenomena signatures comprises lasing modifications to shading, lighting, and colors of various portions of the initial three dimensional representation of the event processing request.

11. The computing platform of claim 1, wherein the one or more unique surface phenomena signatures comprise undulation in the initial three dimensional representation of the event processing request.

12. The computing platform of claim 1, wherein modifying the initial three dimensional representation to include the one or more unique surface phenomena signatures comprises, for various portions of the initial three dimensional representation, modifying shading, modifying lighting, modifying colors, including markings, and creating undulation.

13. A method comprising:

at a computing platform comprising at least one processor, a communication interface, and memory:

receiving, from an initiating user device, an event processing request;

generating, using reflectance transformation imaging (RTI), a first three dimensional representation of the event processing request, wherein generating the first three dimensional representation comprises:

generating an initial three dimensional representation of the event processing request, and modifying, using RTI, the initial three dimensional representation to include one or more unique surface phenomena signatures, wherein a number of the one or more unique surface phenomena signatures is selected based on a value associated with the event processing request and a particular time at which the event processing request is sent;

sending, to a recipient user device, RTI transformation information indicating transformation actions to be performed, using RTI, to produce a second three dimensional representation of the event processing request, wherein a combination of the first three dimensional representation and the second three dimensional representation produces a complete three dimensional representation of the event processing request, and wherein the second three dimensional representation is produced via communication between the recipient user device and the computing platform without transmitting any three dimensional representation to the recipient user device;

generating, using the first three dimensional representation and the second three dimensional representation, the complete three dimensional representation;

identifying whether the complete three dimensional representation is validated; and based on identifying that the complete three dimensional representation is validated, processing the event processing request.

14. The method of claim 13, wherein the event processing request comprises a request to process a transaction.

15. The method of claim 13, wherein the one or more unique surface phenomena signatures comprise adjustments of shading in the initial three dimensional representation.

16. The method of claim 13, further comprising:

generating, after generating the first three dimensional representation, a unique surface template designed to fit into the first three dimensional representation to generate the complete three dimensional representation, wherein the RTI transformation information is defined by the unique surface template.

17. The method of claim 13, wherein the memory stores additional computer-readable instructions that, when executed by the at least one processor, cause the computing platform to:

based on identifying that the three dimensional representation is validated, enabling viewing, by the recipient user device, of details corresponding to the event processing request.

18. The method of claim 13, further comprising:

based on identifying that the three dimensional representation is not validated:

incrementing a failure count corresponding to the event processing request;

comparing the failure count to a predefined failure threshold;

based on identifying that the failure count meets or exceeds the predefined failure threshold, denying fulfillment of the event processing request on behalf of the recipient user device; and based on identifying that the failure count does not meet or exceed the predefined failure threshold, prompting the recipient user device to produce an updated three dimensional representation.

19. The method of claim 13, wherein producing the second three dimensional representation via communication between the recipient user device and the computing platform without transmitting any three dimensional representation to the recipient user device comprises:

granting the recipient user device access to view an obscured representation of the event processing request;

receiving RTI instructions from the recipient user device based on the RTI transformation information; and producing the second three dimensional representation based on the RTI instructions.

20. One or more non-transitory computer-readable media storing instructions that, when executed by a computing platform comprising at least one processor, a communication interface, and memory, cause the computing platform to:

receive, from an initiating user device, an event processing request;

generate, using reflectance transformation imaging (RTI), a first three dimensional representation of the event processing request, wherein generating the first three dimensional representation comprises:

generating an initial three dimensional representation of the event processing request, and modifying, using RTI, the initial three dimensional representation to include one or more unique surface phenomena signatures, wherein a number of the one or more unique surface phenomena signatures is selected based on a value associated with the event processing request and a particular time at which the event processing request is sent;

send, to a recipient user device, RTI transformation information indicating transformation actions to be performed, using RTI, to produce a second three dimensional representation of the event processing request, wherein a combination of the first three dimensional representation and the second three dimensional representation produces a complete three dimensional representation of the event processing request, and wherein the second three dimensional representation is produced via communication between the recipient user device and the computing platform without transmitting any three dimensional representation to the recipient user device;

generate, using the first three dimensional representation and the second three dimensional representation, the complete three dimensional representation;

identify whether the complete three dimensional representation is validated; and based on identifying that the complete three dimensional representation is validated, process the event processing request.

* * * * *